R. J. FRITZ ET AL  2,765,263
PRETREATMENT PROCESS FOR FLUID HYDROFORMING
Filed June 2, 1952
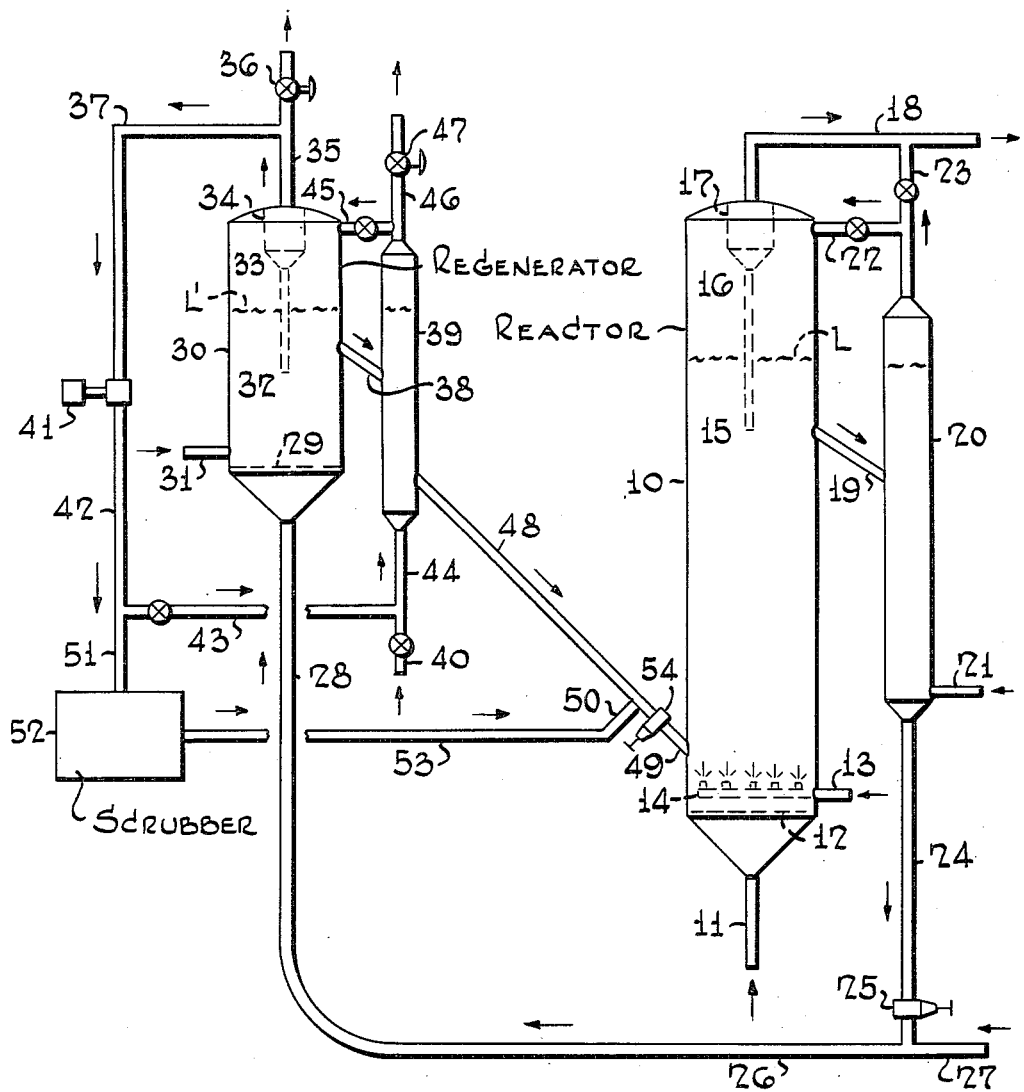
Robert J. Fritz
Lloyd A. Nicolai  Inventors

2,765,263

PRETREATMENT PROCESS FOR FLUID HYDROFORMING

Robert J. Fritz and Lloyd A. Nicolai, Baton Rouge, La., assignors to Esso Research and Engineering Company, a corporation of Delaware Application June 2, 1952, Serial No. 291,084

4 Claims. (Cl. 196—50)

This invention relates to the catalytic conversion of hydrocarbon fractions boiling within the motor fuel boiling range of low knock rating into high octane number motor fuels rich in aromatics and particularly to a process whereby such a conversion is effected by the fluidized solids technique.

Hydroforming is a well known and widely used process for treating hydrocarbon fractions boiling within the motor fuel or naphtha range to upgrade the same or increase the aromaticity and improve the anti-knock characteristics of said hydrocarbon fractions. By hydroforming is ordinarily meant an operation conducted at elevated temperatures and pressures in the presence of solid catalyst particle and hydrogen whereby the hydrocarbon fraction is increased in aromaticity and in which operation there is no net consumption of hydrogen. Hydroforming operations are ordinarily carried out in the presence of hydrogen or a hydrogen-rich recycle gas at temperatures of 750–1150° F. in the pressure range of about 50–1000 lbs. per sq. inch and in contact with such catalysts as molybdenum oxide, chromium oxide or, in general, oxides or sulfides of metals of groups IV, V, VI, VII and VIII of the periodic system of elements, alone, or generally supported on a base or spacing agent such as alumina gel, precipitated alumina or zinc aluminate spinel. A good hydroforming catalyst is one containing about 10 wt. percent molybdenum oxide upon an aluminum oxide base prepared by heat treating a hydrated aluminum oxide or upon zinc aluminate spinel.

It has been proposed in application Serial No. 188,236, filed October 3, 1950, now Patent No. 2,689,823 to effect the hydroforming of naphtha fractions in a fluidized solids reactor system in which naphtha vapors are passed continuously through a dense fluidized bed of hydroforming catalyst particles in a reaction zone, spent catalyst particles are withdrawn from the dense bed in the reaction zone and passed to a separate regeneration zone where inactivating carbonaceous deposits are removed by combustion whereupon the regenerated catalyst particles are returned to the main reactor vessel or hydroforming reaction zone. Fluid hydroforming as thus conducted has several fundamental advantages over fixed bed hydroforming such as (1) the operations are continuous, (2) the vessels and equipment can be designed for single rather than dual functions, (3) the reactor temperature is substantially constant throughout the dense bed, and (4) the regeneration or reconditioning of the catalyst may be readily controlled.

A particular advantage of the foregoing fluid solids operation has been the fact that the freshly regenerated catalyst can be utilized to carry part of the heat required for the hydroforming reaction from the regeneration zone into the reaction zone. It has been proposed in this connection to discharge hot, regenerated catalyst particles from the regenerator standpipe into a stream of hot, hydrogen-rich recycle gas in a transfer line whereby the catalyst particles are subjected to a reconditioning treatthe reactor involving at least a partial reduction of higher catalytic metal oxides formed during regeneration to a lower or more catalytically active form of catalytic metal oxide. In view of the high temperature of the regenerated catalyst (1050–1200° F.) and the exothermic character of the reaction between the hot, freshly regenerated catalyst and the hydrogen, it is necessary to make the transfer line very short and of small diameter in order to keep the time of contact of the catalyst and hydrogen-containing gas sufficiently short to avoid overtreatment and/or thermal degradation of the catalyst.

It is the object of this invention to achieve better control of the reaction between freshly regenerated hydroforming catalyst and hydrogen-containing pretreating gas in a fluidized solids hydroforming reaction system.

It is a further object of this invention to pretreat freshly regenerated hydroforming catalysts with limited amounts of hydrogen in order to prevent overtreatment and/or thermal degradation of the catalyst.

These and other objects will appear more clearly from the detailed specification and claims which follow.

It has been found that in the pretreatment of freshly regenerated hydroforming catalyst with hydrogen-containing gas, it is possible to prevent overtreatment and/or thermal degradation of the catalyst by using at most the stoichiometric amount of hydrogen necessary to reduce the catalyst to its most active form, specifically in the case of molybdena catalysts from the hexavalent to the pentavalent form. Since in normal operation this would result in high moisture partial pressure in the pretreater and/or regenerated catalyst standpipe, and/or transfer line to the reactor and would tend to alter the physical form of the catalytic metal oxide to a crystalline form of reduced activity, it is necessary to lower or minimize the water partial pressure in the pretreater by recycling a large amount of diluent gas, such as recycle flue gas, from the regenerator, nitrogen, scrubbed flue gas, or the like.

Reference is made to the accompanying drawing illustrating a schematic flow plan of one embodiment of the present invention.

In the drawing, 10 is a reactor vessel provided at the bottom with an inlet line 11 for the introduction of hot, hydrogen-rich or recycle process gas. A perforated plate or distributor grid 12 is arranged horizontally within the vessel 10 for insuring uniform distribution of the incoming recycle gas over the entire cross section of the reactor vessel. A separate inlet line 13 connected to a distributor ring 14 or the like is shown for the introduction of naphtha above the grid member 12 although the fresh feed may, if desired, be introduced separately or along with recycle gas below the grid.

The reactor vessel 10 is charged with finely divided hydroforming catalyst particles and the superficial velocity of the vapors and gases passing upwardly through the vessel 10 is controlled as to form a dense, fluidized, turbulent bed of catalyst 15 having a definite level L superposed by a dilute or disperse phase 16 comprising small amounts of catalyst entrained in gaseous or vaporous reaction products. The reaction products are taken overhead from the reactor, preferably through a cyclone separator 17 or the like for separating entrained catalyst particles which are returned to the dense bed 15 through the dip pipe attached to the bottom of the cyclone separator. Reaction products are conducted via line 18 to suitable fractionating stabilizing and/or storage equipment.

Catalyst particles are continuously withdrawn from the dense bed 15 through withdrawal conduit 19 and discharged into an external stripping cell or vessel 20. The erably extending above level L and provided with a restriction orifice or port for controlling the discharge of catalyst into the stripper cell. A tap 21 is arranged in the lower portion of the stripper for introducing a suitable stripping gas such as steam, nitrogen, scrubbed flue gas or the like which will serve to remove entrained or adsorbed hydrogen or hydrocarbon materials that would otherwise be carried to the regeneration zone and burned therein. The stripping gas and stripped gases are withdrawn overhead from stripper 20 and passed through line 22 into the upper part of reactor 10 in the event that substantial amounts of catalyst are entrained therein and recovery of such entrained catalyst in the reactor cyclone separator 17 is desired or through line 23 to product outlet line 18 in the event that it is desired to have the stripping gas by-pass the reactor. The lower end of stripping cell 20 is connected to conduit 24 and forms therewith a standpipe for developing fluistatic pressure in the stripped spent catalyst stream sufficient to facilitate its transfer to the regenerator side. A slide valve 25 or the like is provided near the base of conduit 24 to control the withdrawal of spent catalyst from the reactor and if desired or necessary to maintain the catalyst in a fluidized state one or more gas taps can be provided along conduit 24 for the introduction of fluidizing gas.

The stripped spent catalyst is discharged from the base of the standpipe or conduit 24 into transfer line 26 where it is picked up by a stream of regeneration gas or air supplied through line 27 and conveyed through spent catalyst riser and through perforated plate or grid 29 into regenerator 30. In order to prevent overtreatment of the spent catalyst in transfer line 26 and riser 28, it is preferable to use only part of the air necessary for regeneration for conveying the spent catalyst to the regenerator and to add the remainder of the air necessary for regeneration through a separate inlet line 31 or additional lines discharging directly into the regenerator vessel.

The superficial velocity of the regeneration gases through vessel 30 is so controlled as to form a dense, fluidized turbulent bed 32 of catalyst particles and gas having a definite level L' superposed by a dilute or disperse phase 33 in the upper part of the regenerator comprising small amounts of catalyst entrained in the regeneration gases. The regeneration gases are taken overhead from regenerator 30, preferably through a cyclone separator 34 or the like which serves to remove most of the catalyst particles from the gas for return to the dense bed 32 through the dip pipe attached to the bottom of the cyclone. The regeneration gases pass through outlet line 35 and pressure control valve 36 to a waste gas stack or through regenerator gas recycle line 37 as will be more fully described below.

Regenerated catalyst is withdrawn from dense bed 32 through withdrawal conduit 38 and discharged into pretreating vessel 39. If desired, stripping gas can be introduced in line 38. In view of the fact that large volumes of regenerator flue gas are used as diluent for the treating gas supplied to the pretreating vessel, the use of stripping gas in line 38 is generally superfluous. It is sufficient in any event if the catalyst discharged from the pretreating vessel 39 is substantially free from carbon oxides.

The freshly regenerated catalyst is treated in vessel 39 with hydrogen supplied through line 40. Limited amounts of hydrogen are utilized for the pretreatment, the maximum amount used being the stoichiometric amount necessary to effect a valence change of one, e. g., a conversion of $MoO_3$ to $Mo_2O_5$. Although hydrogen-rich recycle gas may be used as the source of hydrogen, the use of pure hydrogen or recycle gas that has been scrubbed substantially free of hydrocarbon gases simplifies the problem of handling or disposing of the gases discharged from the pretreater when flue gas or nitrogen is used as diluent. In view of the fact that the use of this limited amount of hydrogen would produce an extremely high water vapor partial pressure in the pretreater, it is necessary to add a large volume of diluent gas such as flue gas, nitrogen, or the like to the hydrogen containing pretreating gas. Regenerator flue gas is very convenient for this purpose and accordingly part of the off-gas from regenerator 30 is withdrawn from outlet line 35 through recycle line 37, passed through compressor 41 and thence through line 42 and valve controlled line 43 for mixture with the hydrogen-containing pretreating gas supplied through line 40. The mixture of hydrogen-containing pretreating gas and diluent gas is passed through line 44 into the bottom of pretreater 39 where it contacts the freshly regenerated catalyst. The hydrogen in the pretreating gas reacts with the higher catalytic metal oxides formed during regeneration and reduces them to a lower or more catalytically active form. Although the reaction is exothermic, overtreatment and/or thermal degradation of the catalyst is avoided due to the limited amount of hydrogen used and the presence of the large amount of diluent gas.

The pretreating gases are taken overhead from pretreater 39 and discharged through line 45 into the dilute phase in regenerator 30 provided pure hydrogen or scrubbed recycle reactor gas is used as the source of pretreating hydrogen since the gas would be substantially free from combustible constituents. If unscrubbed recycle gas is used as the source of the pretreating hydrogen, the off-gas from the preheater may be discharged into the regenerator or it may be withdrawn through outlet line 46 and pressure control valve 47 to suitable storage and/or burning equipment if sufficiently rich in combustibles to warrant recovery and use as a fuel gas or the like.

Pretreated catalyst is withdrawn from pretreater 39 through line 48 which serves as a standpipe for developing sufficient fluistatic pressure in the pretreated catalyst to overcome the pressure drop taken in introducing the pretreated catalyst into the reactor at 49. It is desirable to purge the catalyst stream passing through conduit 48 of carbon oxides and accordingly a suitable purge gas such as nitrogen or washed flue gas is introduced into line 48 at 50. The regenerator flue gas can be conveniently used for this purpose by passing part of the recycle regenerator flue gas from line 42 through line 51 into scrubber 52 where it is scrubbed free of carbon oxides. The scrubbed flue gas is then transferred through line 53 to the purge gas tap 50 for introduction into line 48. A slide valve 54 is provided in line 48 to control the flow of pretreated catalyst through line 48 into reactor 10.

The feed or charging stock to the hydroforming reactor may be a virgin naphtha, a cracked naphtha, a Fischer-Tropsch naphtha or the like. The feed stock is preheated alone or in admixture with recycle gas to reaction temperature or to the maximum temperature possible while avoiding thermal degradation of the feed stock. Ordinarily preheating of the feed stock is carried out to temperatures of about 800–1000° F., preferably about 950° F. The naphtha preheat should be as high as possible while avoiding thermal degradation thereof as by limiting the time of residence in the transfer or feed inlet lines. The preheated feed stock may be supplied to the reaction vessel in admixture with hydrogen-rich recycle gas or it may be introduced separately as shown. The recycle gas, which contains from about 50 to 70 volume percent hydrogen, is preheated to temperatures of about 1150–1200° F., preferably about 1185° F. prior to the introduction thereof into inlet line 11. The recycle gas should be circulated through the reactor at a rate of from about 1000 to 8000 cu. ft. per bbl. of naphtha feed. The amount of recycle gas added in preferably the minimum amount that will suffice to carry the necessary heat of reaction into the reaction zone and keep the carbon formation at a satisfactory low level.

The reactor system is charged with a mass of finely divided hydroforming catalyst particles. Suitable catalysts include group VI metal oxides, such as molybdenum oxide, chromium oxide or tungsten oxide or mixtures thereof upon a carrier such as activated alumina, zinc aluminate spinel or the like. Preferred catalysts contain about 5 to 15 wt. percent molybdenum oxide or from about 10 to 40 wt. percent chromium oxide upon a suitable carrier. If desired, minor amounts of stabilizers and promoters such as silica, calcium, ceria or potassia can be included in the catalyst. The catalyst particles are, for the most part, between 200 and 400 mesh in size or about 0–200 microns in diameter with a major proportion between 20 and 80 microns.

The hydroforming reactor vessel should be operated at temperatures between about 850 and 950° F., preferably about 900° F. and at pressures between 50 and 500 lbs. per sq. inch. Temperatures above 900° F. result in increased carbon formation and lower selectivity to gasoline fractions while at temperatures below about 900° F. operating severity is low and would therefore require an excessively large reaction vessel. Lowering reactor pressure below 200 lbs. per sq. inch results in increased carbon formation which becomes excessive below about 25 lbs. per sq. inch. Above 200 lbs., however, catalyst selectivity to light products ($C_4$'s) increases rapidly. The regenerator vessel is operated at essentially the same pressure as the hydroforming reactor vessel 10 and at temperatures of about 110°–1200° F. The average residence time of the catalyst in the reactor is of the order of from about 3 to 4 hours while the average residence time of the catalyst in the regenerator is of the order of from about 3 to 15 minutes.

The weight ratio of catalyst to oil introduced into the reactor should be about 0.5 to 1.5 It is preferred to operate at catalyst to oil ratios of about 1 since ratios above about 1 to 1.5 result in excessive carbon formation. Somewhat higher weight ratios can be used at higher pressures.

Space velocity or the weight in pounds of feed charged per hour per pound of catalyst in the reactor depends upon the age or activity level of the catalyst, the character of the feed stock and the desired octane number of the product. Space velocity for a molybdenum oxide on alumina gel catalyst may vary, for example, from about 1.5 wt./hr./wt. to about 0.15 wt./hr./wt.

The amount of hydrogen supplied to the pretreater is so controlled that it will suffice, at most, to convert the group VI metal component of the catalyst from the hexavalent to the pentavalent form, for example sufficient, at most to convert $MoO_3$ formed during the oxidative regeneration of the catalyst into $Mo_2O_5$.

The amount of hydrogen supplied to the pretreater is governed by the catalytic metal used as well as the degree of reduction desired. For example, in pretreating a catalyst containing 10% of molybdenum oxide upon an alumina gel support the amount of hydrogen supplied to the pretreater should be less than 0.13 s.c.f. per pound of catalyst and is preferably about 0.9 to about 0.12 s.c.f. per pound of catalyst.

Diluent gases supplied to the pretreater may include regenerator flue gas, scrubbed flue gas or nitrogen and the like. The diluent gases are used in sufficient amount to reduce the steam partial pressure in the pretreater to below about 10 lbs. per sq. inch. In 200 p.s.i.g. hydroforming operations, the use of approximately 2.5 to 5.0 s.c.f. of diluent gas per lb. of catalyst will suffice to dilute the steam produced in the pretreater to approximately 5 to 10 p.s.i. partial pressure and will, thereby, inhibit the formation of inert, crystalline catalytic metal oxide.

The foregoing description contains a limited number of embodiments of the present invention. It will be understood that this invention is not to be limited thereto since numerous variations are possible without departing from the spirit of this invention.

What is claimed is:

1. In a process for hydroforming hydrocarbon fractions boiling within the motor fuel range in contact with finely divided hydroforming catalyst particles comprising molybdenum oxide upon an alumina-containing support in accordance with the fluidized solids technique at temperatures of about 850–950° F. and at pressures of from 50 to 500 lbs. per square inch, the improvement which comprises continuously withdrawing a stream of spent catalyst particles from a dense, fluidized bed in the hydroforming reaction zone, regenerating the withdrawn catalyst particles by burning carbonaceous deposits therefrom at elevated temperatures in a separate regeneration zone at substantially the same pressure as in the reaction zone, and thereby simultaneously oxidizing the molybdenum oxide substantially completely to $MoO_3$, withdrawing regenerated catalyst particles from the regeneration zone, contacting the withdrawn regenerated catalyst particles in a separate pretreatment zone at substantially the same pressure as in the reaction zone with at most sufficient hydrogen to convert the $MoO_3$ in the catalyst to $Mo_2O_5$, said hydrogen being mixed with diluent gas selected from the group consisting of scrubbed flue gas and nitrogen in an amount sufficient to reduce the partial pressure of steam in the pretreatment zone to below 10 lbs. per sq. inch, and recycling the treated catalyst particles substantially free from water vapor formed as a by-product in the pretreatment to the reaction zone.

2. The process as defined in claim 1 in which the diluent gas is scrubbed regenerator flue gas.

3. The process as defined in claim 1 in which the diluent gas is nitrogen.

4. The process as defined in claim 1 in which the catalyst comprises 10% molybdenum oxide upon alumina, and the gas supplied to the pretreatment zone comprises a mixture of at most 0.13 s. c. f. of hydrogen and from 2.5 to 5.0 s. c. f. of diluent gas per pound of catalyst.

References Cited in the file of this patent

UNITED STATES PATENTS

| | | |
|---|---|---|
| 2,366,372 | Voorhees | Jan. 2, 1945 |
| 2,455,419 | Johnson | Dec. 7, 1948 |
| 2,509,745 | Riggs | May 30, 1950 |
| 2,602,771 | Munday et al. | July 8, 1952 |
| 2,689,823 | Hardy et al. | Jan. 21, 1954 |